United States Patent [19]

Mori et al.

[11] Patent Number: 4,827,288

[45] Date of Patent: May 2, 1989

[54] PATTERN MEMORY FOR USE IN THERMAL RECORDING

[75] Inventors: Masaaki Mori, Kawasaki; Chiharu Okada, Tokyo, both of Japan

[73] Assignee: Ricoh Company, Ltd., Tokyo, Japan

[21] Appl. No.: 154,448

[22] Filed: Feb. 5, 1988

Related U.S. Application Data

[63] Continuation of Ser. No. 643,061, Aug. 22, 1984, abandoned.

[30] Foreign Application Priority Data

Aug. 22, 1983 [JP] Japan ................................ 58-152888

[51] Int. Cl.$^4$ .............................................. G01D 15/00

[52] U.S. Cl. ................................ 346/76 PH; 400/120

[58] Field of Search ......................... 346/76 PH, 76 R; 400/120; 219/216 PH; 358/296, 298; 364/518–522

[56] References Cited

U.S. PATENT DOCUMENTS 3,845,850 11/1974 Herr et al. ....................... 346/76 PH 4,309,712 1/1942 Iwakura .......................... 346/76 PH 4,415,907 11/1985 Suemori ......................... 346/76 PH 4,464,669 8/1984 Sekiya et al. ......................... 400/120

*Primary Examiner*—Arthur G. Evans

*Attorney, Agent, or Firm*—Cooper & Dunham

[57] ABSTRACT

A pattern memory for use in a thermal printer system stores a temperature-compensated pattern of a character to be printed on recording paper using a thermal print head having a plurality of heat-producing elements arranged in a single array is provided. The pattern is defined in the form of a dot matrix, each dot containing two or more binary data, each of which, if having a predetermined one of the two possible states, is associated with a predetermined activation time period for activating one of the heat-producing elements. The binary state of each of the two or more data in each dot is determined such that a level of heat produced by any of the heat-producing elements may be maintained at constant. In one embodiment having two binary data in each dot, the pattern is determined such that the one of the two data of a dot has "0" and the other has "1" if this dot is to be printed for a second time or more by the same heat-producing element in succession.

9 Claims, 4 Drawing Sheets

PATTERN MEMORY FOR USE IN THERMAL RECORDING

This is a continuation of application Ser. No. 06/643,061, filed Aug 22, 1984, now abandoned.

BACKGROUND OF THE INVENTION

1. Field of the Invention

This invention generally relates to thermal or heat-sensitive recording for recording an image, such as a character, on a recording medium using a thermal print head, and in particular, to a structure for storing a pattern of a particular image to be printed for use in driving a thermal print head including a single array of heat-producing elements.

2. Description of the Prior Art

Thermal printers are well known in the art. Typically, a thermal printer includes a thermal print head provided with an array of heat-producing elements which are activated selectively in accordance with an image signal thereby recording an image on a recording medium while the thermal print head and the recording medium are moved relative to each other. For low speed recording, serial print-type thermal printers having a movable print head, which moves along a platen roller in a reciprocating manner, have been mostly used; on the other hand, for high speed recording, line print-type thermal printers having a stationary print head with a single array of heat-producing elements extending across the full width of a recording medium, which is moved relative to the print head in the direction normal to the array, have been mostly used.

A thermal print head for use in a thermal printer includes a plurality of heat-producing elements, typically electrical resistors, which are arranged in an array and which are activated selectively to produce heat which is then applied to a recording paper directly to form a "burn" or darkened spot, if the recording paper is heat-sensitive in nature, or through heat-sensitive tape interposed between the print head and the recording paper, if the recording paper is plain paper. In this manner, during recording, each of the heat-producing elements is activated and deactivated repetitively. Such a thermal print head has a particular thermal time constant which is determined by such parameters as the material used and the structure employed. Thus, the timing of activation and deactivation must be determined in consideration of this thermal time constant.

Stated more in detail in this respect with reference to FIG. 1, it is assumed that each of the heat-producing elements provided in the form of an array on a thermal print head is activated for time period $t_1$ and then deactivated for time period $t_2$, and, thus, time period $t_1$ corresponds to heating cycle and time period $t_2$ corresponds to cooling cycle. Under the condition, if cooling time period $t_2$ is set too short, the next heating cycle starts before the heat-producing element has cooled sufficiently, so that the peak temperature at the end of the next heating cycle will become higher than that of the preceding cycle as indicated in FIG. 1. Since the density of a recorded image increases as the level of temperature produced by the heat-producing element increases, the density of a recorded image gradually increases as recording proceeds.

In order to cope with such a situation, there has been proposed to shorten time period $t_3$ of the next following heating cycle as compared with time period $t_1'$ of the preceding heating cycle as shown in FIG. 2. With such a scheme, the peak temperature may be maintained at constant even if the heat-producing element is activated successively. Several methods have been proposed to control the activation time period by comparing the image data in two successive lines. For example, according to a technique disclosed in Japanese Laid-open Patent Pub. No. 58-94485, in order to correct the thermal hysteresis from the preceding line, a longer heating time period is provided if the heat-producing element is to be activated for the first time and a shorter heating time period is provided if the heat-producing element is to be activated for the second or later time in succession, thereby allowing to obtain a printed image of uniform density and to prevent the heat-producing element from being overheated. In this case, the activation time period is determined line by line by comparing the image data in two successive lines. Such a technique, however, is rather limited in speed.

FIG. 3 shows a character pattern of number "2" stored in a character generator. Such a character pattern is typically stored in a read only memory in the form of 0s and 1s. That is, in the illustrated example, the character pattern is defined in the form of a matrix having 7 rows and 5 columns with the shaded areas indicating the corresponding heat-producing elements to be activated thereby forming "burn" points on recording paper. In FIG. 3, "M" indicates the main scanning direction which coincides with the longitudinal direction of single array of heat-producing elements and "A" indicates the auxiliary scanning direction in which there exists relative movement between the array and the recording paper, as well known for one skilled in the art. When this character pattern is used with the above-described prior art technique, it is so controlled that the longer heating time period is provided for the data at the intersection between column 5' and row 2 but the shorter time period is provided for the data at the intersection between column 1' and row 2 because the heat-producing element is activated for the second time in succession for the latter data. However, as described above, this is disadvantageous because comparison of data between the two successive lines must be carried out line by line.

SUMMARY OF THE INVENTION

It is therefore a primary object of the present invention to obviate the above-described disadvantages of the prior art and to provide an improved thermal recording technique.

Another object of the present invention is to provide a memory for storing a temperature-compensated pattern of an image to be printed using a thermal print head.

A further object of the present invention is to provide a technique for high-speed thermal printing.

A still further object of the present invention is to enhance uniformity in density of a thermally printed image.

Other objects, advantages and novel features of the present invention will become apparent from the following detailed description of the invention when considered in conjunction with the accompanying drawings.

DESCRIPTION OF THE PREFERRED EMBODIMENTS

Figure 1:
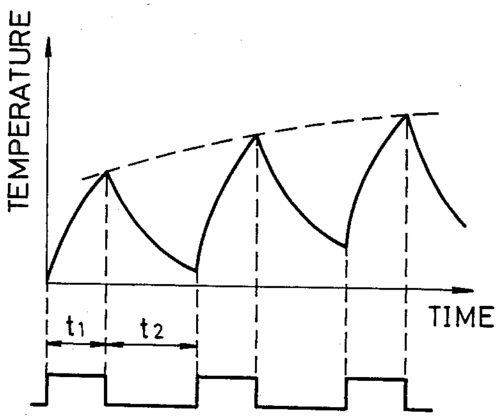
FIG. 1 PRIOR ART
FIG. 1 is a graph illustrating the tendency of gradual increase in temperature when the particular heat-producing element of prior art thermal print head is activated in repetition too rapidly.
Figure 2:
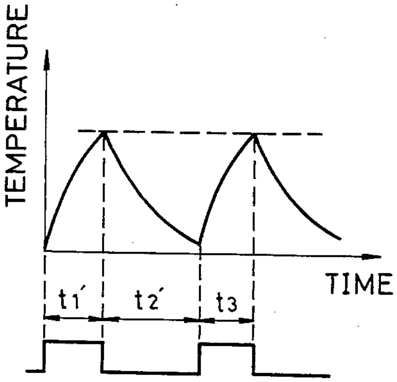
FIG. 2 PRIOR ART
FIG. 2 is a graph illustrating the method of maintaining the temperature by shortening the heating time period if the same heat-producing element is to be activated for the second time or more in succession.
Figure 3:
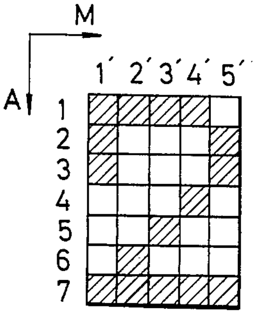
FIG. 3 PRIOR ART
FIG. 3 is a schematic illustration showing a prior art pattern memory which stores in the form of matrix of 7 rows by 5 columns a pattern for number "2" to be printed by a thermal print head.
Figure 4:
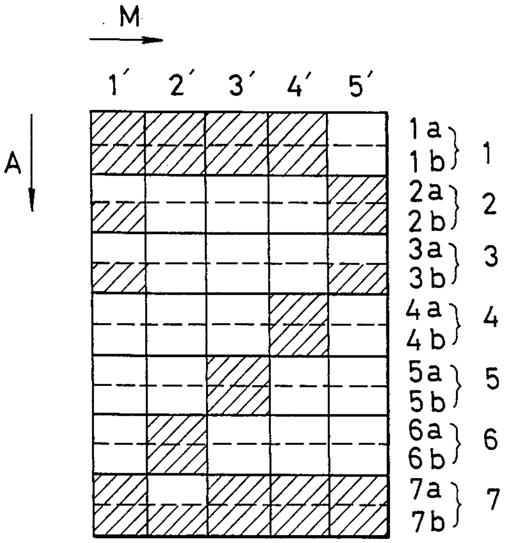
FIG. 4 is a schematic illustration showing the structure of a temperature-compensated pattern memory constructed in accordance with one embodiment of the present invention in which each row is comprised of two sub-rows a and b whereby each dot, or intersection between a row and a column, contains two activation control sections or data arranged in the auxiliary scanning direction A with only one of the two activation control sections used (as indicated by shaded box) for activating the heat-producing element when it is to be activated for the second time or more in succession.

Referring now to FIG. 4, there is shown in schematic a temperature-compensated pattern for number "2" stored in a memory, preferably in a read only memory, for use in a thermal printer system for printing an image in the form of dot matrix using a thermal print head having a plurality of heat-producing elements, such as electrical resistors, arranged in a single array. The overall structure of the pattern shown in FIG. 4 is similar to that shown in FIG. 3. However, in the structure shown in FIG. 4, each row is comprised of two sub-rows a and b. For example, row 1 includes sub-rows 1*a* and 1*b* arranged in the auxiliary scanning direction A. Therefore, each dot or intersection between a row and a column contains two activation control sections or data. It is to be noted that each of the two activation control sections or data is associated with a predetermined activation or heating time period, and each activation control section indicated by a shaded box signifies that the corresponding heat-producing element is to be activated for the associated predetermined time period. The two predetermined activation time periods for the respective two activation control sections in a dot may be same or different.

The temperature-compensated pattern is determined so as to obtain a printed image of uniform density when thermal recording is carried out using a single array of heat-producing elements with a relative motion between the thermal array and recording paper. Described more in detail in this respect with reference to the embodiment shown in FIG. 4, the pattern is so formed that only one of the two activation control sections or data in a dot (second activation control section in the illustrated embodiment) is used for activation of the corresponding heat-producing element if it is to be used for the second time or more in succession in thermal recording operation. For example, since the second dot at the intersection between column 1' and row 2 is to be burned for the second time in succession, only its second activation control section at the intersection between column 1' and sub-row 2*b* is to be used for activation of the corresponding heat-producing element. Thus, the other data for the dot at the intersection between column 1' and row 2 is not used for activation of the corresponding heat-producing element.

In the case where the two activation control sections in each dot are associated with an identical activation time period, the activation time period for the dot at the intersection between column 1' and row 1 is twice as that for the next following dot at the intersection between column 1' and row 2. The same arguments hold true for the dots at the intersections between column 1' and row 3, column 2' and row 7 and column 5' and row 3. For the dot having two shaded boxes, the corresponding heat-producing element is activated for a longer period of time since it is the dot which is to be formed in the current line without forming a dot in the last preceding line in the corresponding column. As is obvious for one skilled in the art, each box contains a binary data, 1 or 0; for example, the preferred embodiment may be so structured that a white box contains binary 0 indicating no activation and a shaded box contains binary 1 indicating activation and thus formation of a "burn" on recording paper. It will thus be easily understood that the character pattern of FIG. 4 is most preferably stored in a semiconductor memory, such as a read only memory. When so stored, it is only necessary to read out the pattern data from the memory and the data thus read out may be directly used for controlling the activation of heat-producing elements provided on the thermal print head.

It is to be noted that, as a modification of the pattern illustrated in FIG. 4, the first activation control data may be used instead of the second in the case where only one of the two activation control data is to be used. Or as a still further modification, either one of the two activation control data may be used selectively as desired.

Figure 5:
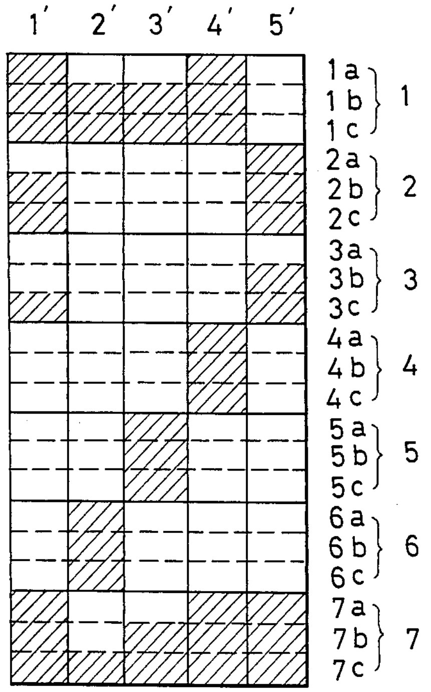
FIG. 5 is a schematic illustration showing the structure of another temperature-compensated pattern memory embodying the present invention in which each row is comprised of three sub-rows a, b and c whereby each dot contains three activation control sections or data arranged in the auxiliary scanning direction A.

FIG. 5 shows another embodiment of the present invention in which each row of character pattern is comprised of three sub-rows a, b and c. For example, row 1 includes sub-rows 1*a*, 1*b* and 1*c*. Thus, each dot or "burn" to be formed on heat-sensitive recording paper by a heat-producing element is controlled by three activation control data. Similarly with the previous embodiment, it should be understood that the three activation control data are associated with respective predetermined activation time periods, which may differ one from another. If the respective time periods are identical, the dot having three shaded boxes have a total activation time period which is three times longer than that of the dot having only a single shaded box.

In the embodiment shown in FIG. 5, the character pattern is so structured that, for the dot to be printed second time in succession, the last two activation control data are used to obtain a total activation time period by combining the respective activation time periods associated therewith, and for the dot to be printed third time or more in succession, only the last activation control data is used to obtain a total activation time period. This may be easily understood by inspecting the first three dots in column 1'. Furthermore, if the adjacent two dots on both sides in the same row are to be formed at the same time, one of its activation control data is omitted. This will be well understood by examining the dots at the intersection between column 2' and row 1 or column 3' and row 1. The dot at the intersection between column 2' and row 7 is of particular interest. That is, since this dot is to be formed by activating the corresponding heat-producing element for the second time in succession, its first activation control data is not used; moreover, since this dot is to be formed at the same time with the two adjacent dots on both sides, i.e., dot between column 1' and row 7 and dot between column 3' and row 7, its second activation control data is not used either. As a result, the total time period for activating the corresponding heat-producing element for forming the dot between column 2' and row 7 is determined solely by the activation time period associated with the third activation control data.

Also in this embodiment, it may be so modified that any of the three activation control data is used selectively. As a matter of fact, it is not critical as to which of the three activation control data or sections is used as will become clear later because each of the control data is associated with a predetermined activation time period. Although it has been described such that a total activation time period is obtained by combining the associated activation time periods, this is not critical to the present invention and individual activation time periods may be applied to the heat-producing elements as separate driving pulses. In addition, the above description concerns the case in which the auxiliary scanning direction coincides with the vertical direction of a character to be printed; however, the present invention is equally applicable to the case in which the auxiliary scanning direction coincides with the horizontal direction of a character to be printed. In the latter case, however, each column, instead of row, should contain two or more sub-columns.

Figure 6:
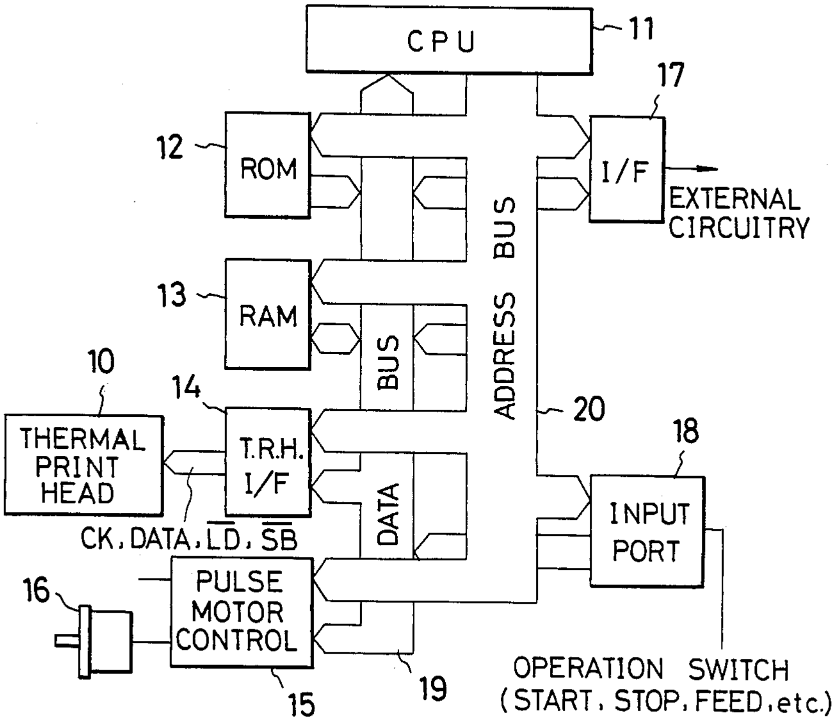
FIG. 6 is a block diagram showing a system for controlling a thermal print head to which the memory pattern of the present invention as shown in FIGS. 4 and 5 may be advantageously applied.

FIG. 6 shows a typical thermal print control system to which the temperature-compensated character pattern of the present invention may be advantageously used. As shown, the thermal printer control system for controlling the operation of a thermal print head 10 includes a central processing unit (CPU) 11, a read only memory (ROM) 12 for storing such information as system software and a character pattern, a random access memory (RAM) 13 for storing data temporarily, a thermal print head interface (T.P.H. I/F) 14, a pulse motor control 15 for controlling the operation of a pulse motor 16, which is typically connected to a platen roller (not shown) to advance recording paper in contact with and relative to the thermal print head 10, an interface 17 for connection with an external circuitry and an input port 18 for connection with various operational switches. These elements are interconnected by a data bus 19 and an address bus 20 as shown in FIG. 6. For the purpose of illustration, it will be assumed in the following description that the temperature-compensated character pattern shown in FIG. 5 is stored in ROM 12.

Figure 7:
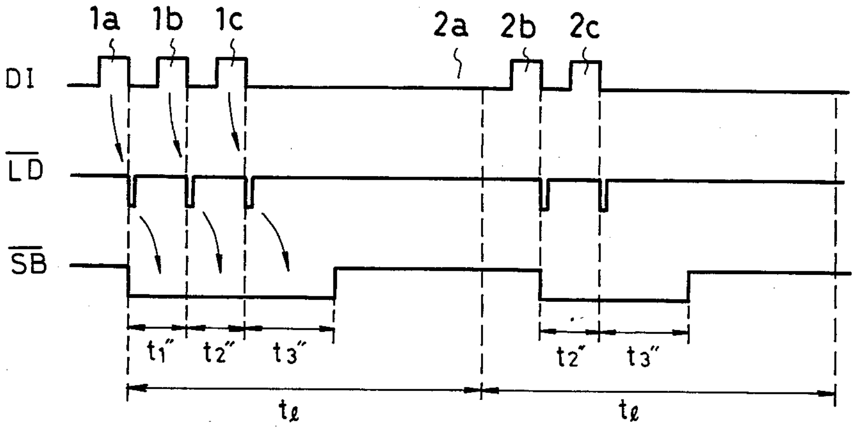
FIG. 7 is a timing chart which is useful for understanding the operation when the character memory of FIG. 5 is used in the system of FIG. 6.

FIG. 7 shows how an activation pulse to be supplied to the corresponding heat-producing element of thermal print head 10 is obtained at the thermal print head interface 14 from the data read out of ROM 12. Stated more in detail, DI in FIG. 7 is the data read out of ROM 12 corresponding to column 1' in the character pattern of FIG. 5. Since all of the three boxes in row 1 of column 1' are shaded, they have binary 1 as indicated by pulses 1*a*, 1*b* and 1*c*, which then produce $\overline{LD}$ pulses. It is to be noted that three sub-rows a, b and c are associated with predetermined activation time periods $t_1''$, $t_2''$ and $t_3''$, respectively. These time periods may be determined arbitrarily in relation to row-to-row time period $t_1$ and stored in a memory, such as ROM 12 or RAM 13. For example, for $t_1=4$ ms, it may be set such that $t_1''=0.3$ ms, $t_2''=0.5$ ms and $t_3''=1.3$ ms, and, for $t_1=10$ ms, it may be set such that $t_1''=0.2$ ms, $t_2''=0.3$ ms and $t_3''=2$ ms.

When a $\overline{LD}$ pulse is produced, its corresponding activation time period, $t_1''$, $t_2''$ or $t_3''$, is retrieved, and the thus retrieved activation time periods for the same dot are combined to form an activation pulse $\overline{SB}$ for activating the corresponding heat-producing element to print a dot on recording paper. The next row, or row 2, of column 1' has only two shaded boxes. In other words, column 1', sub-row 2*a* has binary 0 and sub-rows 2*b* and 2*c* each have binary 1. As a result, no $\overline{LD}$ pulse is produced for sub-row 2*a*, so that the resultant activation pulse has a total time period which is a combination of $t_2''$ and $t_3''$. In this manner, in accordance with the present invention, the activation time period for each of the heat-producing elements arranged in the form of a single array on the thermal print head 10 is suitably controlled just by reading out the character pattern data stored in ROM 12 since the character pattern itself has been arranged in consideration of temperature compensation. It is to be noted that as an alternative embodiment, such a temperature-compensated character pattern may be stored into a RAM 13 under software control.

Figure 8:
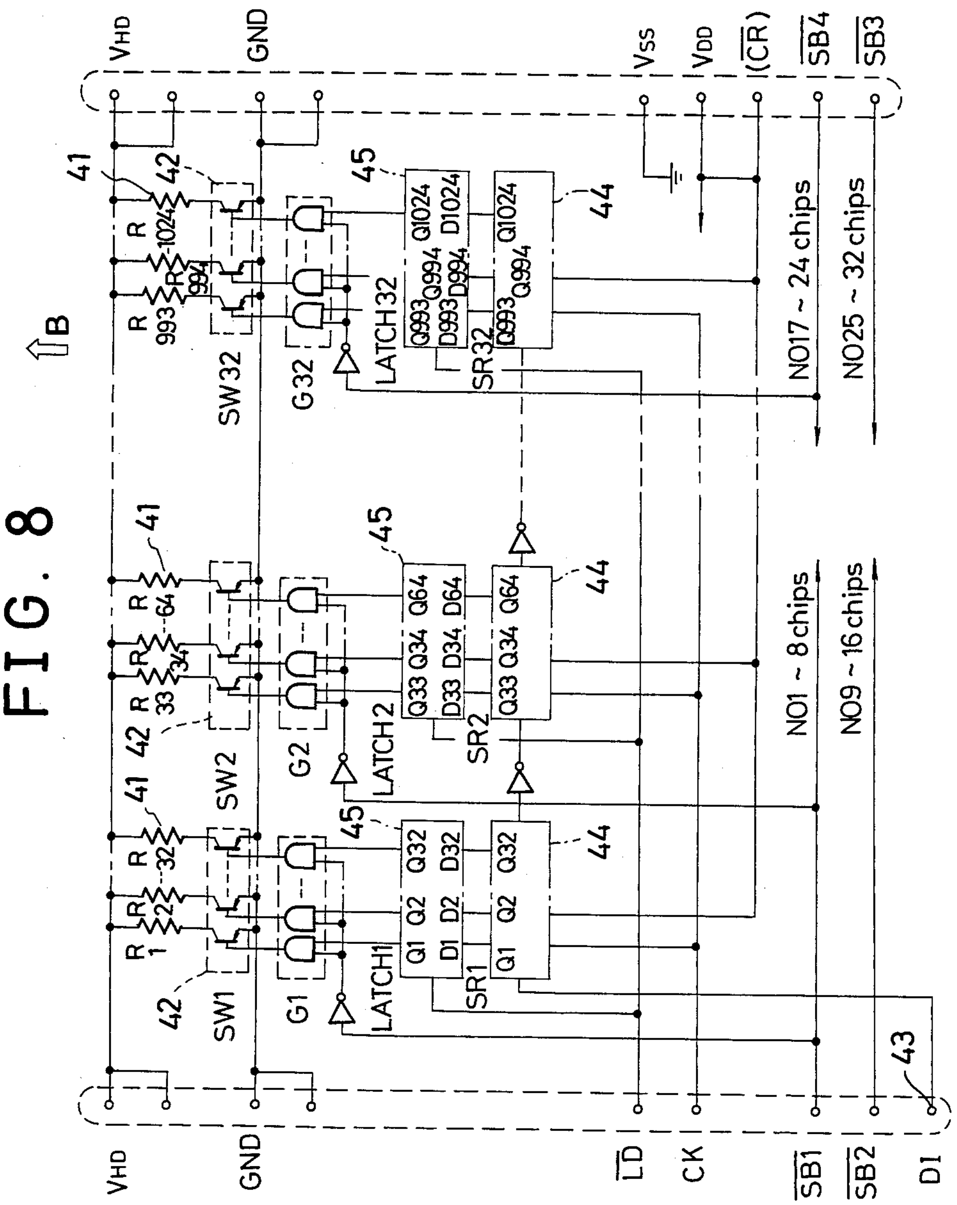
FIG. 8 is a schematic illustration showing the detailed structure of a thermal print head which may be used in the system of FIG. 6.

FIG. 8 shows the detailed structure of a thermal print head which may be advantageously used in the system of FIG. 6. As shown, the thermal print head includes a plurality, typically 1,024 as in the illustrated example, of electrically resistive elements 41, or R1 through R1024, each of which produces heat when an activation current pulse is passed therethrough and which are arranged linearly at a predetermined pitch. Also provided are 32 driver modules which are arranged side-by-side along the array of electrically resistive elements as connected to the corresponding 32 grouped electrically resistive elements. There are provided switching transistors 42 or SW1 through SW32, AND gates G1 through G32, 32-bit latches 45 or LATCH1 through LATCH32, and 32-bit serial-in-parallel-out shift registers 44 or SR1 through SR32. Each of the switching transistors 42 has its collector connected to one end of the corresponding electrically resistive element 41, whose the other end is connected to a predetermined high voltage $V_{HD}$, its emitter connected to ground voltage GND and its base connected to the output of the corresponding AND gate G, whose one input is connected to receive a strobe signal $\overline{SB}$ through an inverter and the other input connected to the corresponding output of the latch 45. The latch 45 has 32 inputs each of which is connected to the corresponding one of 32 outputs of the corresponding shift register 44. The latch 45 has also an input to receive a load signal $\overline{LD}$ and the shift register 44 has an input to receive digital image data DI through a terminal 43.

In operation, digital image data DI comprised of 0s and 1s for a single line or row are first supplied into the shift register SR1 through SR32, and, when the shift registers SR1 through SR32 are all supplied with digital image data, these digital image data are transferred to the corresponding latches at the timing of a load singal $\overline{LD}$. Then strobe signals $\overline{SB1}$ through $\overline{SB4}$ are supplied to the AND gates G1 through G32 to have the switching transistors 42 turned on selectively for a regulated time period, thereby allowing a current to flow through the electrically resistive elements 41 selectively. As is obvious for one skilled in the art, it is to be noted that recording paper (not shown) is moved in the direction indicated by arrow B with respect to the thermal print head of FIG. 8 which is typically held stationarily. Thus, the recording paper moves in the direction perpendicular to the longitudinal direction of the array defined by the electrical resistive elements 41.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A system for controlling the operation of a thermal print head including a plurality of heat-producing elements arranged in the form of a single array and selectively activated to effect thermal printing on recording paper in a relative motion in respect to said thermal print head, said system comprising:

storing means for storing a two-dimensional character pattern previously defined in an n rows by m columns dot matrix, each dot of said rows or said columns corresponding to a respective one of said array of heat-producing elements and having associated therewith in said storing means at least two binary data storage elements each of which is associated with a predetermined activation time period of the respective heat-producing element, each of said binary data storage elements corresponding to a respective sub-section of an activation time of a respective heat producing element for a respective dot; the binary data storage elements for the subsections relating to each dot of said character pattern being selectively defined such that a heat level produced by any of said heat-producing elements may be maintained constant; and control means for controlling reading out of binary data from said storing means and for supplying the binary data thus read out directly to said thermal print head to thereby regulate the time period of activation of each of said plurality of heat-producing elements.

2. The system of claim 1 wherein said relative motion between said thermal print head and recording paper is in the column direction and each of said rows contains a plurality of sub-rows, each sub-row containing one binary data in each column.

3. The system of claim 2 wherein said storing means includes a semiconductor memory.

4. The system of claim 3 wherein said semiconductor memory is a read only memory.

5. A memory for storing a temperature compensated two-dimensional pattern of an image to be printed on recording paper in a dot matrix format using a thermal print head including a plurality of heat-producing elements arranged in the form of a single array, each of said plurality of heat-producing elements forming a dot on said recording paper when activated to apply heat to said recording paper, said pattern being previously defined in the form of a dot matrix having a plurality of rows and columns whereby said pattern can be directly applied to said thermal print head, each dot of said image having associated therewith in the memory at least two binary data storage elements for storing at least two binary data each of which is associated with a predetermined activation time period for activating a corresponding one of said plurality of heat-producing elements, wherein said predetermined activation time period is used only when the associated binary data in said binary data storage elements has a predetermined one state of two states, the state of each of the binary data in each dot being pre-determined selectively such that a heat level produced by any of said plurality of heat-producing elements may be maintained constant.

6. The memory of claim 5 wherein at least one of the at least two binary data of a particular dot has the other state and the other of the at least two binary data has said predetermined one state if said particular dot is to be printed by the same heat-producing element for at least a second time in succession.

7. The memory of claim 5 wherein at least one of the at least two binary data of a particular dot has the other state and the other of the at least two binary data has said predetermined one state if said particular dot is to be printed by one of said plurality of heat-producing elements together with two adjacent heat-producing elements arranged on both sides thereof.

8. The memory of claim 5 wherein said memory is a semiconductor memory.

9. The memory of claim 8 wherein said semiconductor memory is a read only memory.

* * * * *